UNITED STATES PATENT OFFICE.

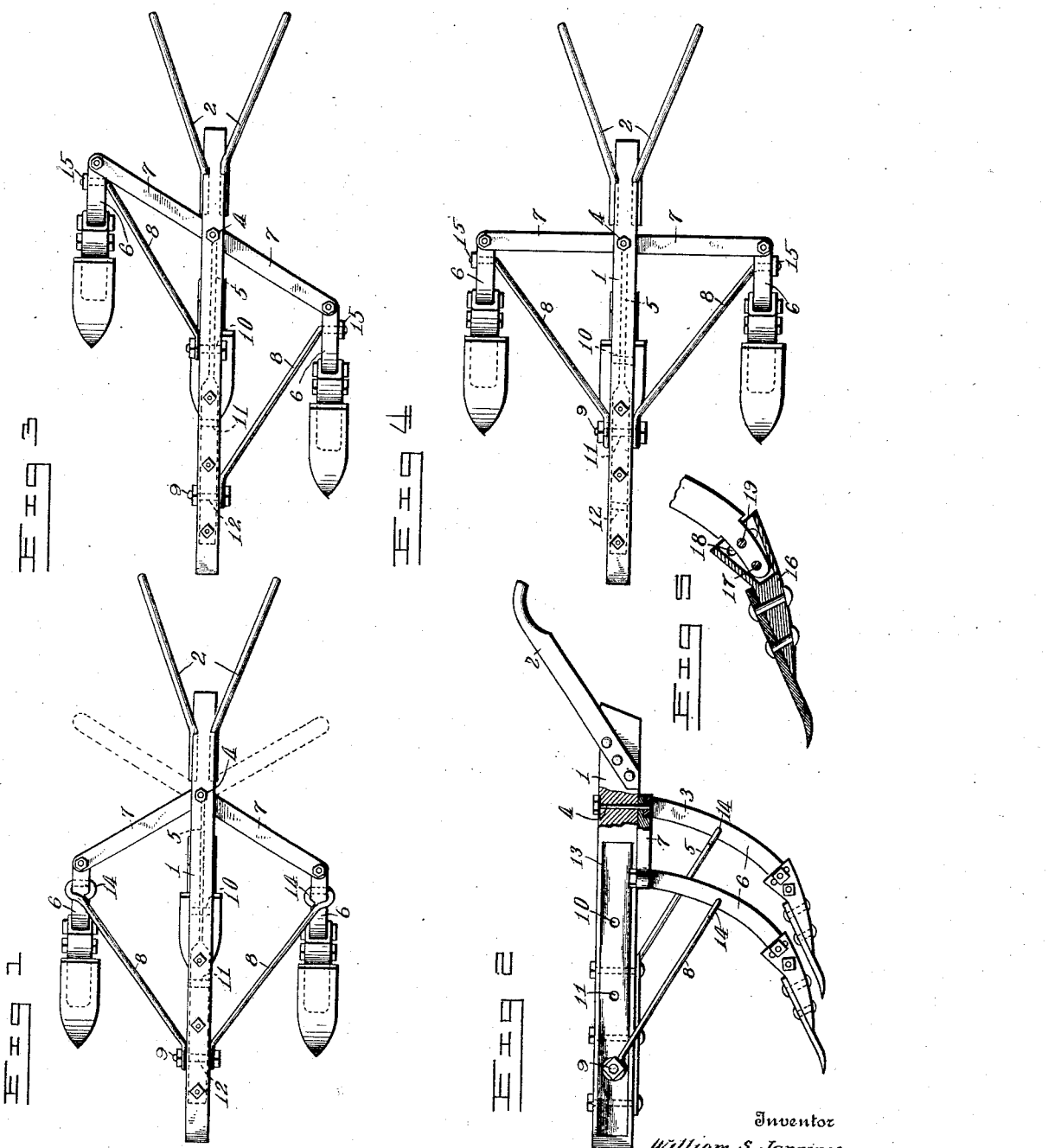

WILLIAM S. JENNINGS, OF LYON, MISSISSIPPI.

PLOW.

No. 866,657.      Specification of Letters Patent.      Patented Sept. 24, 1907.

Application filed July 18, 1906. Serial No. 326,641.

*To all whom it may concern:*

Be it known that I, WILLIAM S. JENNINGS, a citizen of the United States, residing at Lyon, in the county of Coahoma and State of Mississippi, have invented certain new and useful Improvements in Plows, of which the following is a specification.

My invention relates to improvements in plows, and it consists in the constructions, combinations and arrangements herein described and claimed.

The object of my invention is to provide a strong and rigidly braced plow, capable of convenient adjustment to meet all practical conditions of operation.

In the accompanying drawings, forming a part of this application and in which similar reference symbols indicate corresponding parts in the several views:

Figure 1 is a plan view, illustrating one embodiment of my invention, showing the cross-beam adjusted in its forward angular position; and indicating in broken lines the rearward angular position of the cross-beam; Fig. 2 is a side elevation of the construction shown in Fig. 1; Fig. 3 is a plan view, showing each of the standards rigidly braced to the plow beam in a different position of the cross beam; Fig. 4 is a plan view, showing the cross-beam adjusted to constitute a straight harrow, and, Fig. 5 is a detail sectional view, clearly illustrating the construction of my improved plow point, or shovel.

Referring to the drawings, 1 indicates a plow beam provided with the usual handles 2.

A central standard 3 is secured to the plow beam by a king pin 4 and a forwardly extending brace 5. A cross-beam, carrying a plurality of plow standards 6, is shown comprising two arms 7 pivotally secured to the plow beam 1 by the king pin 4. Brace rods 8, secured to the standards on the cross-beam, are constructed to be attached to the plow beam by bolts 9 which can be inserted in any one of a series of openings 10, 11 or 12. Plates 13 are preferably secured to the sides of the plow beam to protect the beam and provide a strong seat for the bolts 9.

From the above description, it will be seen that, by inserting the bolts 9 in the proper opening, the two arms of the cross-beam can be conveniently adjusted and held rigidly braced in any of the positions indicated in the drawings.

In Figs. 1 and 2, the brace rods 8 are shown provided with eyes 14 extending through openings in the standards 6. Figs. 3 and 4 illustrate a modification in which the brace rods 8 extend through the standards 6 and are secured by nuts 15.

Referring to Fig. 5 of the drawings, the plow point or shovel 16, is pivotally secured at 17 to the lower end of its standard, and provided at 18 with either a series of openings; or a slot, to receive a locking bolt 19, for locking the plow point in any of its adjusted positions about its pivotal support 17.

It will be obvious that any kind of plow shovels can be used, such as scrapers and turning shovels; and that the central shovel can be taken off and the plow used as a double shovel.

Having thus described my invention, what I claim as new and desire to secure by Letters Patent is:—

1. In a plow, the combination of a plow beam, a cross-beam pivotally secured to said plow beam, plow standards carried by said cross-beam, a brace rod attached to each of said several standards, and adjustable means for securing said brace rods at different points on said plow beam for firmly bracing the plow standards in any desired angular position of said cross-beam, substantially as described.

2. In a plow, the combination of a plow beam, a cross beam pivotally secured to said plow beam, plow standards carried by said cross-beam, a brace rod swingingly attached to each of said several standards and extending angularly to said plow beam, and means for securing said brace rods at different points on said plow beam for firmly bracing the several plow standards in any desired angular position of said cross beam, substantially as described.

In testimony whereof I affix my signature in presence of two witnesses.

WILLIAM S. JENNINGS.

Witnesses:
    GIVEN PRENATHAN,
    E. D. ALEXANDER.